Aug. 18, 1964
T. KATTIS
3,144,755
SMALL BLOCK ICE MAKING MACHINE
Filed July 24, 1961
9 Sheets—Sheet 3
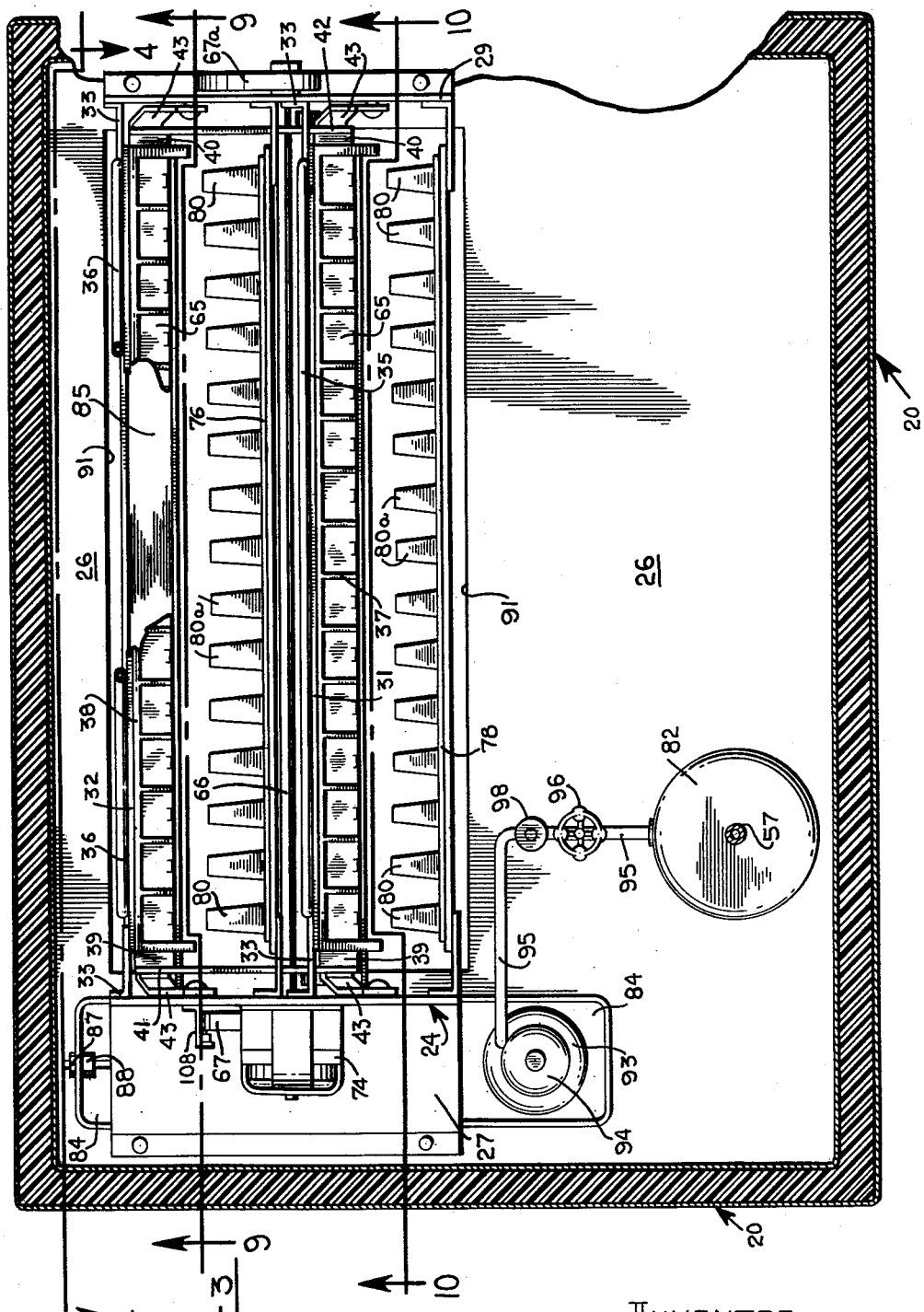
INVENTOR
THEODORE KATTIS
BY Herbert A. Weinturn
ATTORNEY

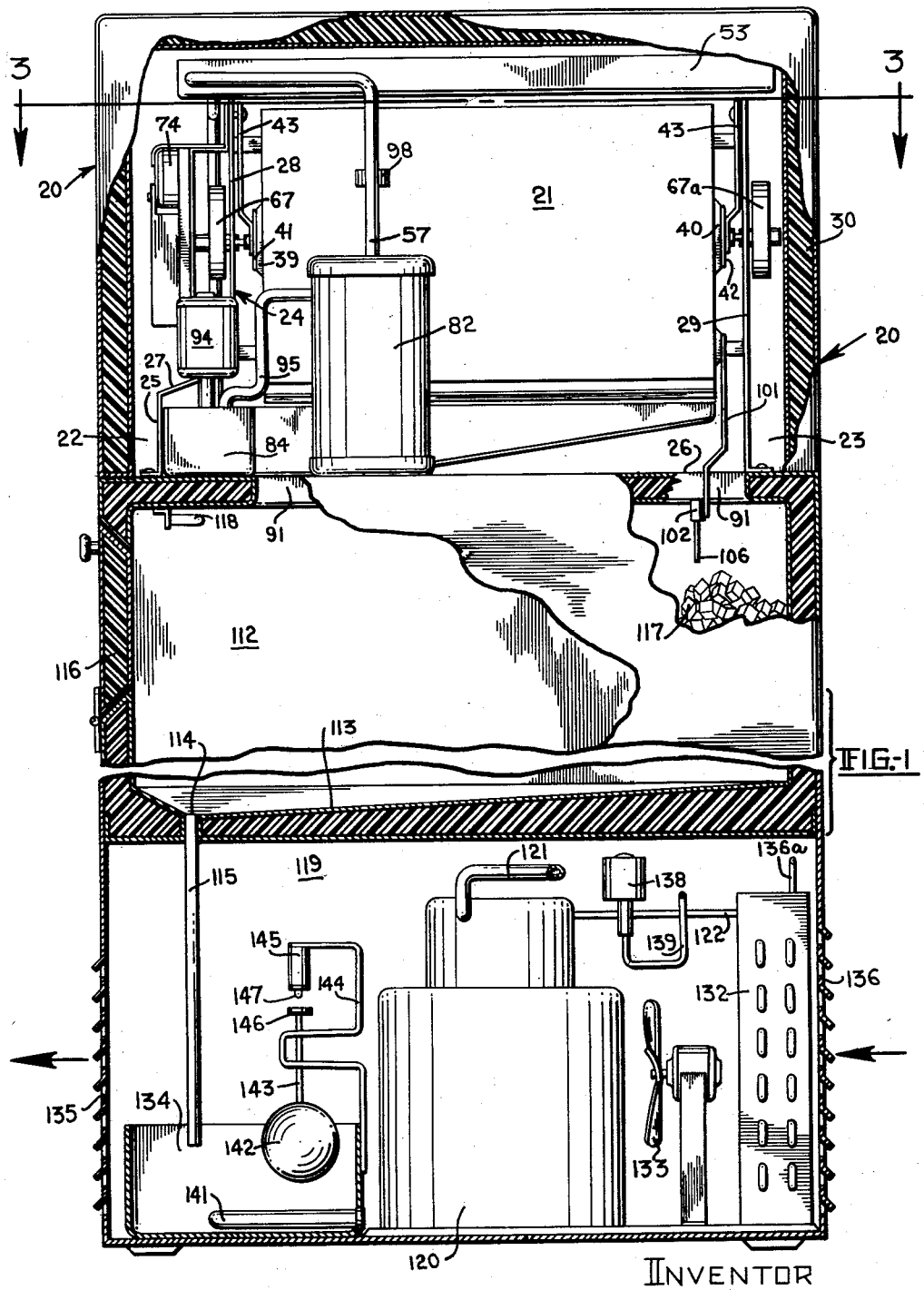

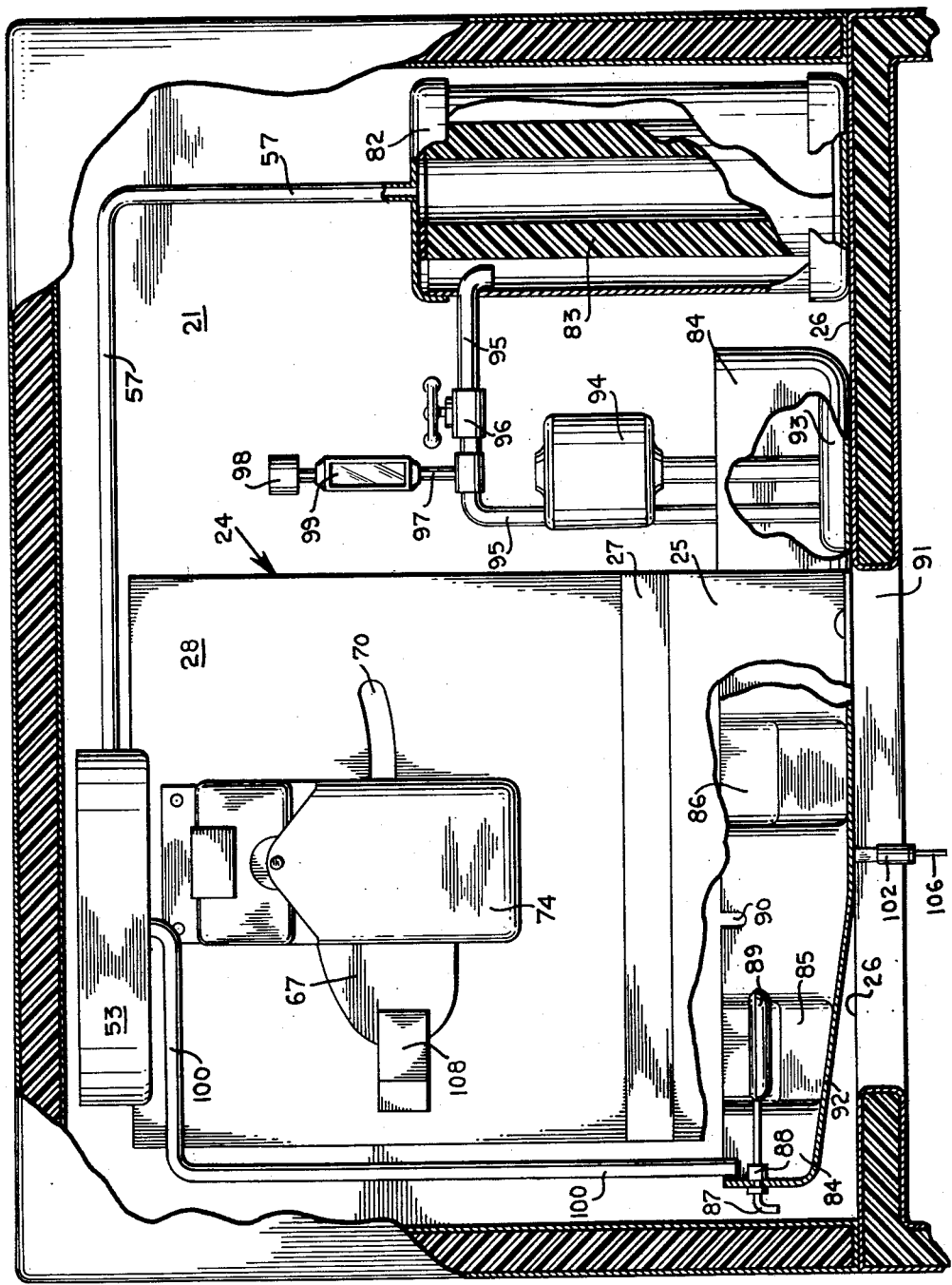

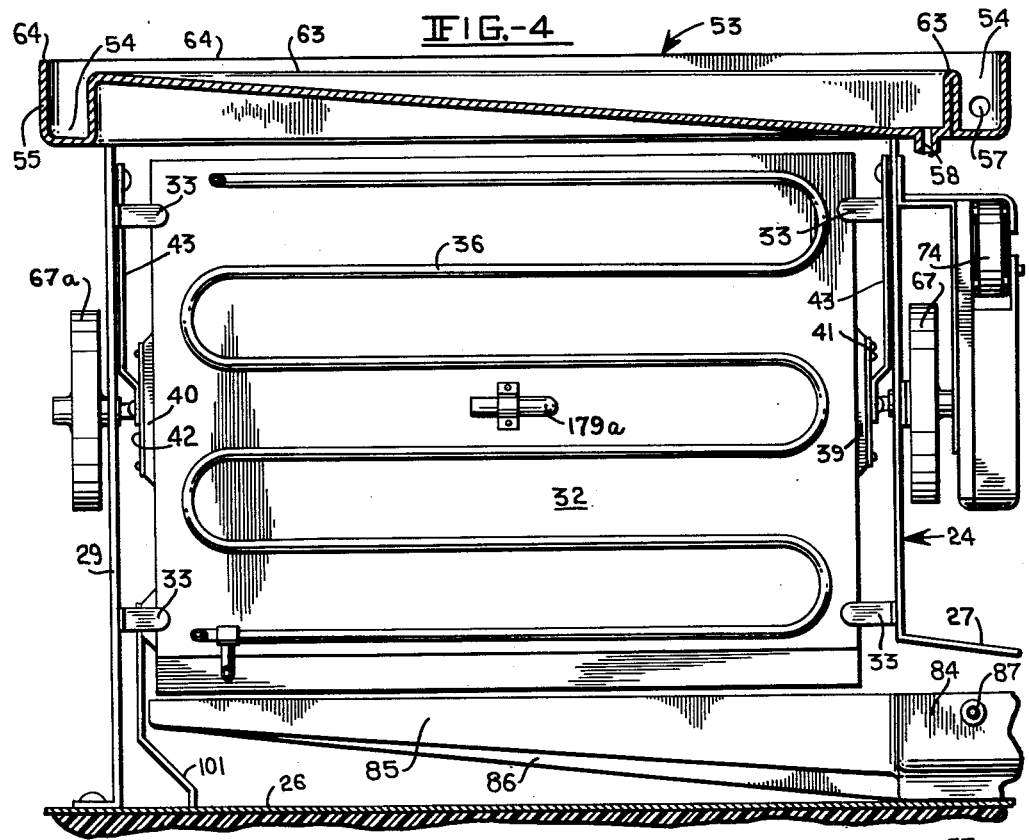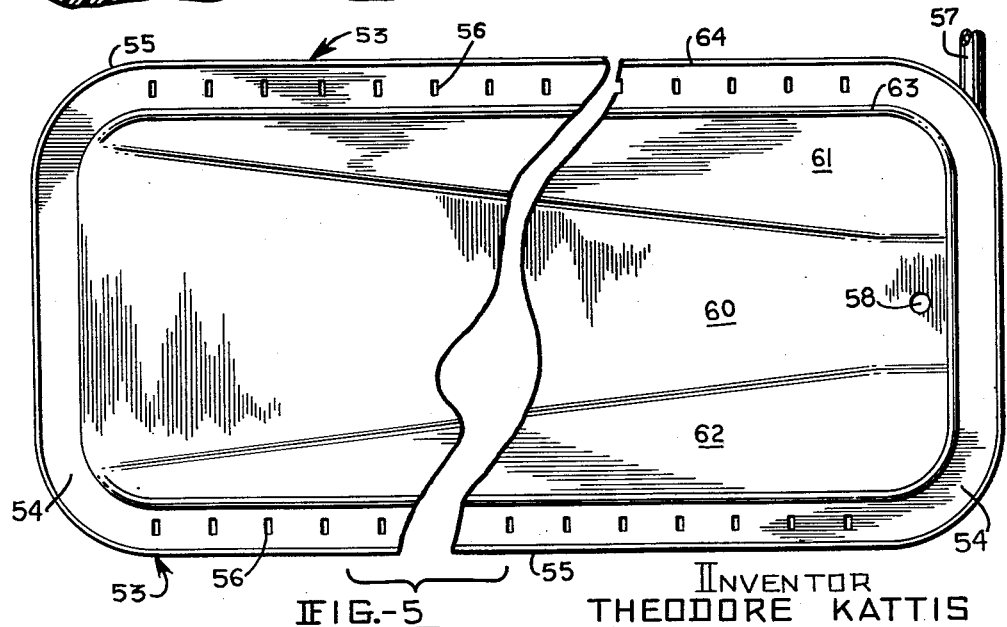

Aug. 18, 1964 T. KATTIS 3,144,755
SMALL BLOCK ICE MAKING MACHINE
Filed July 24, 1961 9 Sheets-Sheet 5
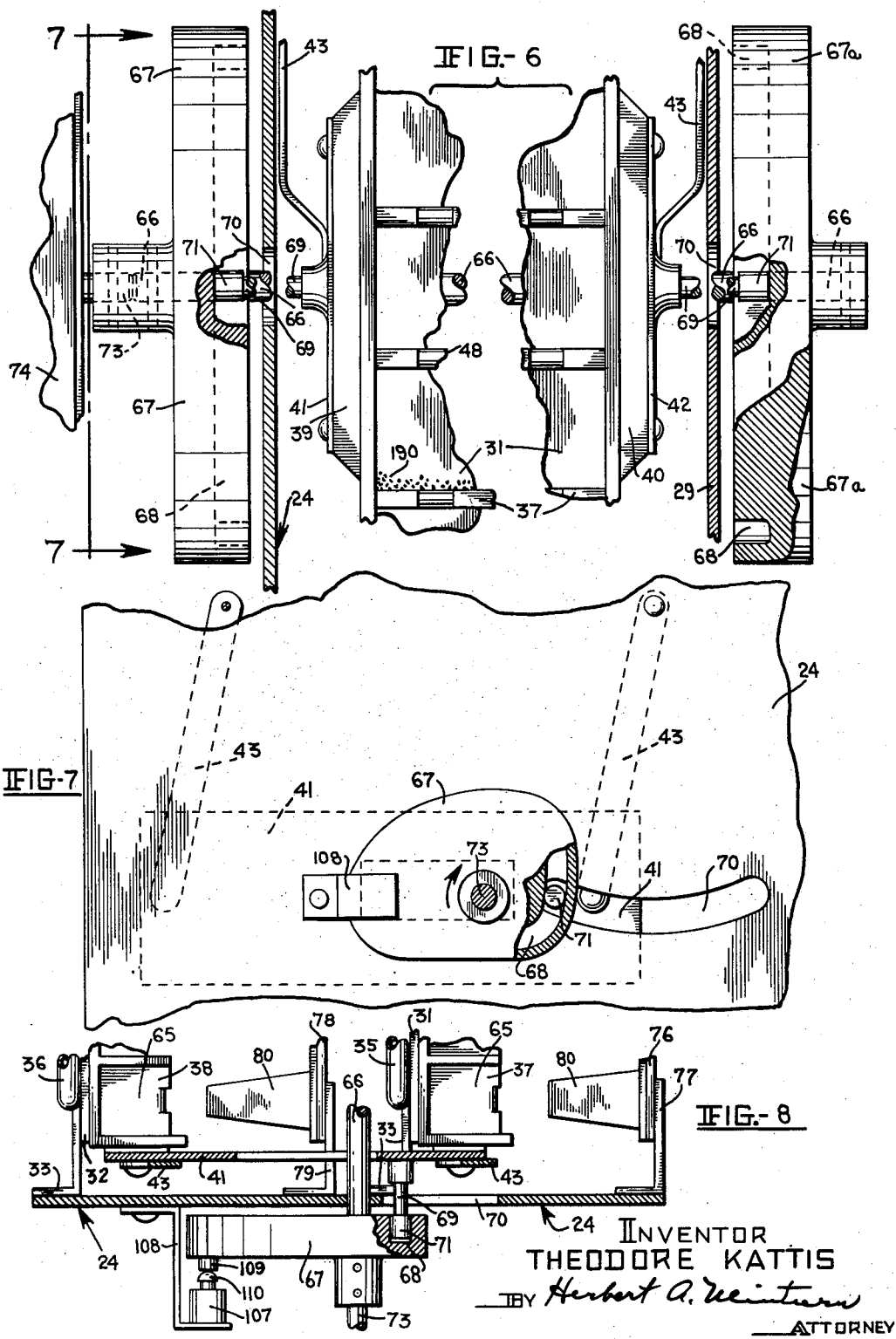
INVENTOR
THEODORE KATTIS
BY Herbert A. Weinturn
ATTORNEY

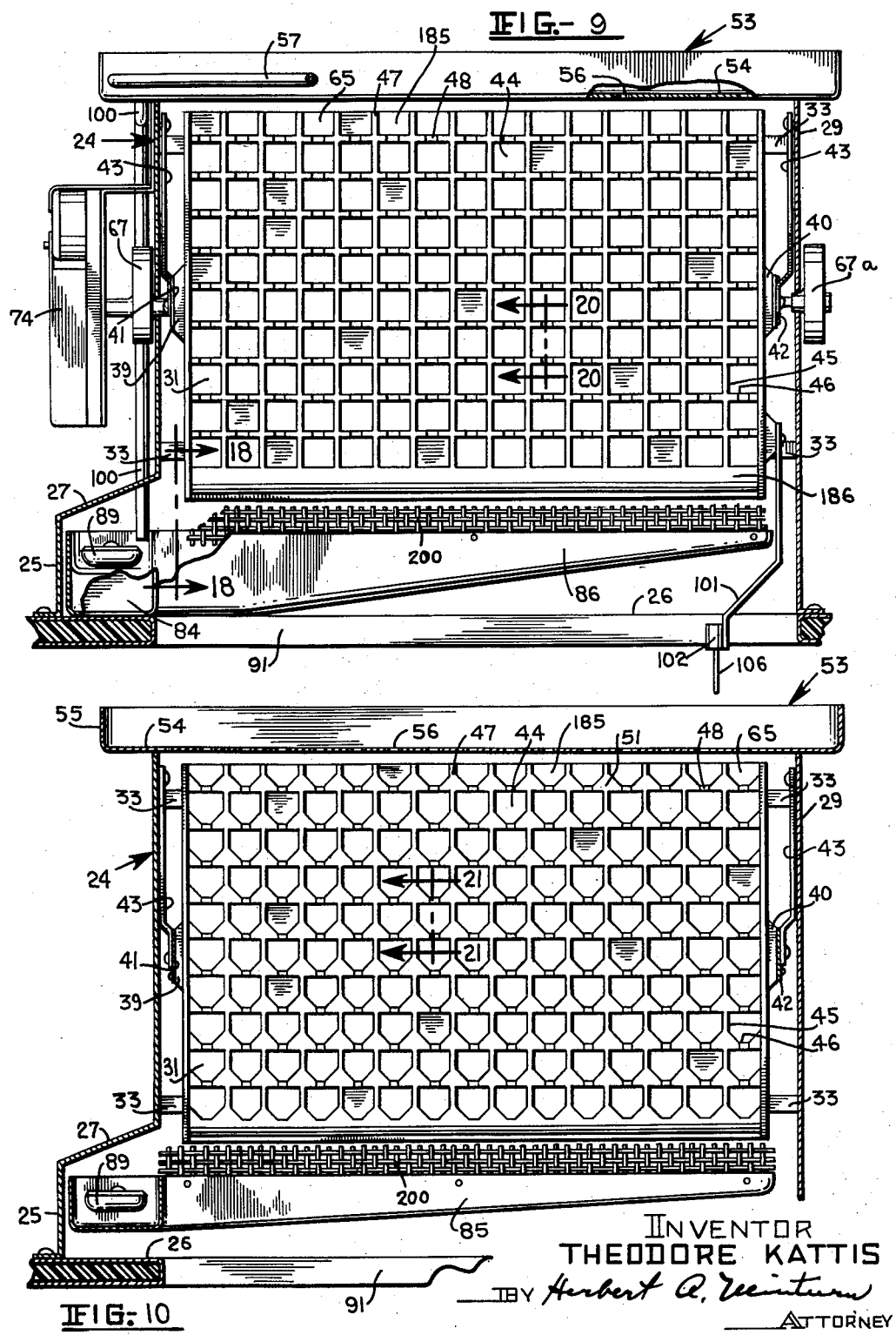

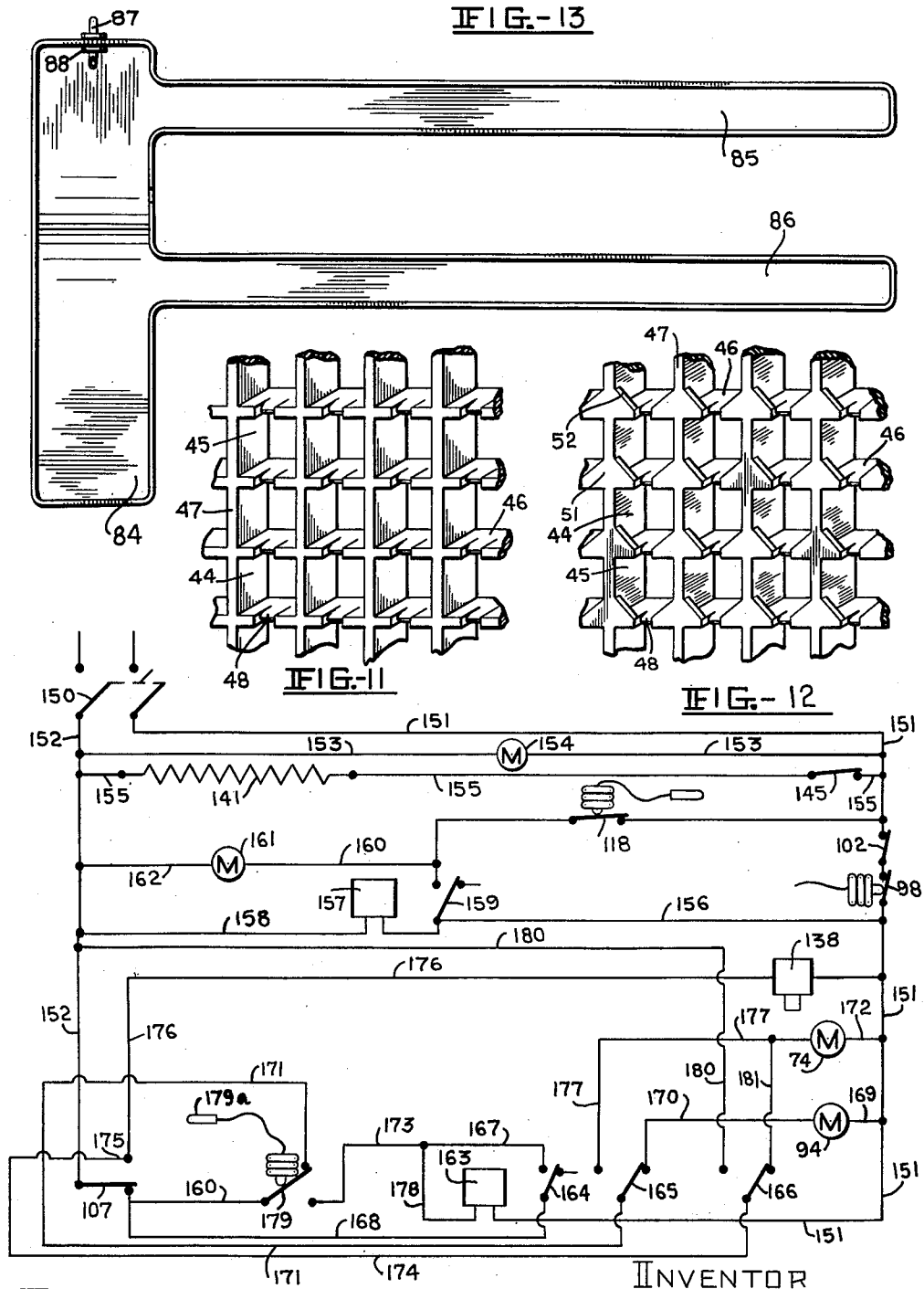

Aug. 18, 1964  T. KATTIS  3,144,755
SMALL BLOCK ICE MAKING MACHINE
Filed July 24, 1961  9 Sheets-Sheet 9
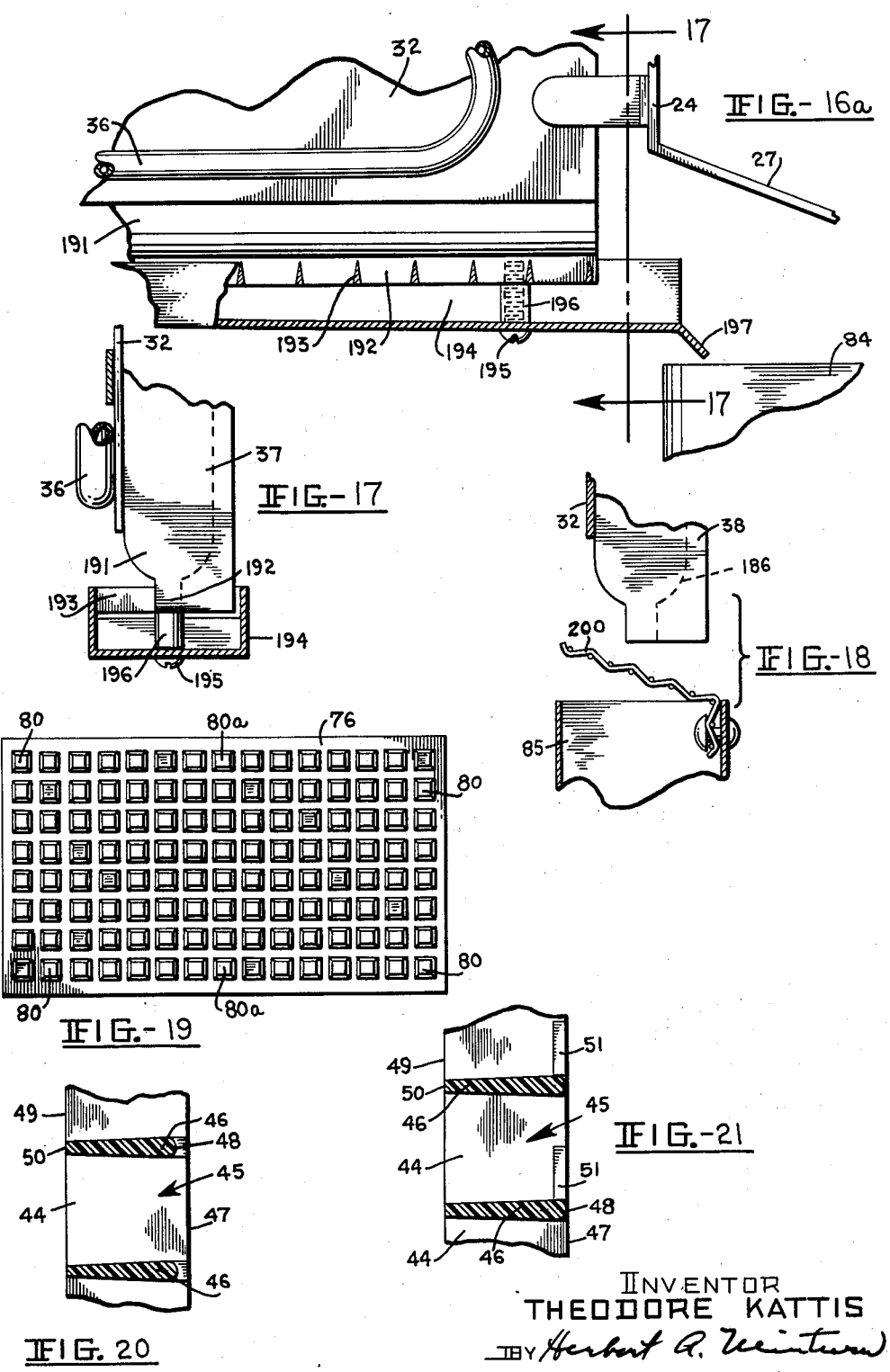
INVENTOR
THEODORE KATTIS
BY Herbert A. Weintraub
ATTORNEY United States Patent Office 3,144,755
Patented Aug. 18, 1964

3,144,755
SMALL BLOCK ICE MAKING MACHINE
Theodore Kattis, 1220 M St., Bedford, Ind.
Filed July 24, 1961, Ser. No. 126,127
10 Claims. (Cl. 62—137)

This invention relates to a device for making in quantity blocks of preferably clear ice, the blocks being of small dimensions such as permits their use in glasses and the like in serving liquids to drink. Of course there are other uses for such blocks, as may become evident to the individual users.

The invention consists briefly of improvements in the making of small, clear ice blocks in a structure comprising means for setting up a water flow across a grid of cells into and out of which cells the water flows. These cells are each open on opposite sides, one side being alternately closed and opened by a refrigerating plate, and from the open sides of the cells the ice blocks formed therein are progressively pushed. The invention also includes in the means a water purifying system.

Primary objects of the invention include a closed water system wherein there is no drain or water outlet from the device permitting the device to be protable except that there must be a water supply from some source through a tube or pipe.

An object is to separate impurities such that will precipitate primarily from the water before reaching freezing surfaces, or water supply courses. An object is to supply water from which the foreign matter has been largely purged to flow over freezing surfaces of ice mold cells and have part of that water congeal into ice and part of the water wash on across the forming ice and out of the cells, this flowing water being kept above the freezing point.

An object embodied in the water supply system is to maintain the distributing of the water in a very simple manner which may provide structure readily cleaned and not receptive to the formation of scale or coatings of material in the water.

Another object of the invention resides in the fact that should any foreign matter be incorporated in exposed surfaces of the ice, resulting in a soft or honeycombed opaque mass, such ice will be removed from the block proper along with its impurities by a slight flow of water over the block while the block is held in a space having an ambient temperature slightly above the freezing point and yet low enough to prevent the material thawing of the blocks while preventing adherence of one block to another.

A further object of the invention is to provide a structure which will produce a planar face on the respective sides of the blocks rather than concave faces, particularly on the face over which the water may flow, so as to avoid the thin-like edges otherwise forming along the boundaries of the face.

A still further object of the invention resides in the use of the chilling of air by the refrigerating medium to maintain collected ice blocks at the temperature above indicated.

The primary object is of course to provide a device which will provide in general an economical, efficient, and facile operating machine.

These and many other objects and advantages of the invention will become apparent to those versed in the art in the following description of one particular form of the invention as illustrated in the accompanying drawings, in which:

FIG. 1 is a view in left hand side elevation of a device embodying the invention wherein the outer wall is broken away to disclose partially in section the mechanism mounted therein;

FIG. 2 is a view in front elevation and partial section of mechanism in the upper, freezing compartment of the machine;

FIG. 3 is a view in horizontal section on the line 3—3 in FIG. 1;

FIG. 4 is a view on an enlarged scale on the line 4—4 in FIG. 3:

FIG. 5 is a view in top plan of a water supply pan;

FIG. 6 is a view in left hand side elevation and partial section showing the relationship of grid driving cams and the grids;

FIG. 7 is a view in detail in vertical section on the line 7—7 in FIG. 6;

FIG. 8 is a detail in top plan and section of one end of the grid drive mechanism;

FIG. 9 is a view in vertical section on the line 9—9 in FIG. 3;

FIG. 10 is a view in vertical section on the line 10—10 in FIG. 3, showing a form of grid modified from that shown in FIG. 9;

FIG. 11 is a view on an enlarged scale in perspective of a fragment of the grid design shown in FIG. 9;

FIG. 12 is a view in perspective on an enlarged scale showing a fragment of the modified form of grid shown in FIG. 10;

FIG. 13 is a view in top plan of the water collecting tank;

FIG. 14 is a wiring diagram;

FIG. 16a is a detail in vertical elevation and partial section of a modified form of grid flow water collector;

FIG. 17 is a view on an enlarged scale of a detail showing a modified form of a lower end of a grid and water collection trough on the line 17—17 in FIG. 16a;

FIG. 18 is a detail in vertical section on the line 18—18 in FIG. 9;

FIG. 19 is a view in side elevation of an ice moving pin plate;

FIG. 20 is a detail in vertical section on the line 20—20 in FIG. 9 of a grid showing shape of floor; and FIG. 21 is a detail in vertical section on the line 21—21 in FIG. 10.

Figure 15:
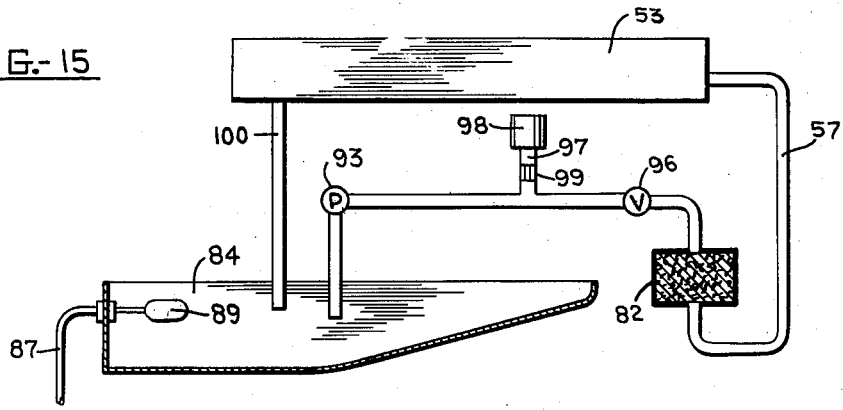
FIG. 15 is a diagram of the water circulation flow.

Reference is made to my copending application for U.S. Letters Patent No. 44,708, filed July 22, 1960, and allowed January 16, 1961.

*Refrigerating Cabinet*

In the uppermost part of the machine generally designated by the numeral 20 there is a refrigerating cabinet designated by the numeral 21. The front end of this cabinet 21 will be designated by the numeral 22 and the rear end portion by the numeral 23. In the front portion 22, there is a mounting plate 24 secured by a base end 25 to the floor 26 on which the cabinet 21 rests. From the base portion 25, the plate 24 extends rearwardly and upwardly by a length 27. From the upper end of the portion 27, the plate extends vertically upwardly in a planar portion 28.

A second mounting plate 29 is fixed to the floor 26 and extends vertically upwardly in planar form. This second plate 29 is fixed to the floor 26 forwardly a slight distance from the rear wall 30 of the cabinet 21. The cabinet defining wall 30 and the walls continuing therefrom are insulated in order to retard heat transfer therethrough.

A pair of planar freezing plates 31 and 32 are fixed in approximately vertical positions in parallelism one with the other to the plates 24 and 29 in spaced apart relation as best indicated in FIG. 3. These plates 31 and 32 are held in fixed positions by being secured to the plates 24 and 29 in any suitable manner, herein shown as by means of a bracket 33 at each corner portion of the plates, FIGS. 3 and 4.

There are a pair of coils 35, 36 each fixed respectively to right hand sides of the freezer plates 31 and 32. These coils 35, 36 carry the refrigerating medium to conduct heat away from the freezer plates 31 and 32. They may assume any desired configuration or form, and are herein shown as being a continuous looping design.

A pair of grids designated by the numerals 37 and 38 are swung between the mounting plates 24 and 29. Each of the grids 37 and 38 has a projecting boss 39 and 40 at front and back ends respectively. A plate 41 ties together the front ends of the grids 37 and 38 through their bosses 39 to hold the grids in rigid, spaced apart, parallel relation. Likewise a plate 42 ties together the rear ends of the grids 37 and 38 through their bosses 40 further holding the grids in that rigid spaced apart parallel relation, the two grids being approximately vertically positioned.

A pair of identical arms 43 has each of lower ends thereof rockably attached to the tie plate 39 at its outer end portions respectively and both arms 43 extend upwardly to be rockably mounted by their other ends on the respective mounting plate 24. A second pair of identical arms 43 each has its lower end rockably attached to the outer end portions of the rear tie plate 42 and extends upwardly to have its other end rockably attached to the rear mounting plate 29. The spacing apart of the upper end mounting of these arms 43 on the plates 24 and 29 is identical to the spacing apart of the lower ends of these arms in their connections with the respective plates 41 and 42. Therefore, the two grids may be swung from side to side between the mounting plates 24 and 29 in parallelism, approximately vertically in all positions of the permissible swinging. The swinging of the two grids in unison to the right is limited by reason of these grids coming into contact respectively with the freezer plates 31 and 32, FIG. 3.

Each of these grids has regularly defined cells 44 extending therethrough, opening from both sides of the grid in each instance, FIGS. 9, 10, 20, and 21.

Each cell 44 in the form indicated in FIGS. 9 and 20 is defined by vertically disposed walls 45 and horizontally disposed floor walls 46 crossing each other at right angles in an integral manner. These walls define a rectangular cell which is open from both left and right hand sides. As indicated in FIG. 20, the floor wall 46 in each instance terminates short of the right hand edge 47 of the vertical wall 45, centrally only of the cell 44 by a rounded edge portion 48. The left hand edges 49 and 50 of the vertical walls 45 and horizontal walls 46 respectively are in a common plane, and seat in a substantially water tight joint against the freezer plates 31 and 32 respectively, when the grids are swung thereagainst.

A modified form of a grid is indicated in FIGS. 10 and 12, wherein there is added to the structure shown in FIGS. 9 and 11 a corner gusset-like member 51, the free edge 52 of which slopes downwardly from a vertical wall 45 to the floor wall terminating at the edge of the rounded nose portion 48. These members 51 are on each side of the vertical wall 45 in each instance.

A water distributing pan 53 is mounted across and in spaced relation from the upper ends of the pair of grids 37 and 38. The pan is herein shown as being carried by the upper end portions of the mounting brackets 24 and 29, FIGS. 4, 5, 9, and 10. Referring to FIG. 5, this pan 53 is generally rectangular in shape with rounded corners. The pan 53 extends across, in spaced relation as above indicated, both grids 37 and 38 and throughout and slightly beyond their lengths.

The pan 53 has a generally U-shaped water flow trough 54 entirely therearound and inside of the upturned marginal wall 55. The fore and aft lengths of this trough 54, one length on each side portion of the pan 53, are provided with a series of holes 56 therethrough of any desired configuration, but herein shown and preferred as being in the nature of transversely positioned slots. There are no openings through the end runs of the trough 54. These slots 56 are in alignment with the tops of the grids 37 and 38 when they are positioned against their respective freezing plates 31 and 32. A water supply pipe 57 enters the trough 54 preferably tangentially thereof as indicated in FIG. 5. The central portion of the pan 53 slopes from one end in a tapering manner down to an outlet opening 58 at a lowermost zone within the area between the trough 54. The central sloping portion 60 of the pan 53 has side portions 61 and 62 sloping theretoward so that in the event that the trough 54 receives water at too rapid a rate through the pipe or tube 57, it may overflow from the trough 54 if not carried through the openings 56 fast enough and into the central portion of the pan over the walls 60–62 to drain out the opening 58. The inner edge of the enclosing wall 63 of the trough 54 is made to be lower than the outer edge 64 so that there will be no overflow of water outside of the pan, FIG. 4.

The upper end portions of the grids are made, with incomplete cells 65 entirely across the grid in each instance. These cells differ only from the cells 44 in that they are open from the topsides and have backs 185 on the plate side, so as to receive water therein from the slots 56, these slots 56 being in alignment substantially centrally of these cells 65.

Reference is made to FIGS. 6–8 in describing the means employed for rocking the grids 37 and 38 against the freezing plates 31 and 32 and therefrom to ice disgorging positions. A shaft 66 extends in a fore and aft direction revolubly through the mounting plates 24 and 29. On each outer end portion of the shaft 66, beyond the mounting plates 24 and 29, there is fixed to the shaft 66 an identical cam 67 and 67a; each cam has a track groove 68 generally oval in configuration. The cams 67 and 67a are so mounted that the groove 68 is direct in one cam toward that in the other cam, FIG. 6. A pin 69 is fixed in each instance to the grid tie plates 41 and 42 to extend through a slot 70 in the mounting plates 24 and 29. The pin 69 preferably has a roller 71 on its end entering the slot 68, FIGS. 7 and 8. The shaft 66 and its two attached cams 67 and 67a are connected to a motor shaft 73 herein shown as fixed to the cam 67, this shaft 73 extending from a driving motor 74.

The drive motor 74 may be of any desired type or construction, but normally will be a motor having a speed gear reduction included with it. It is desired that the shaft 66 rotate at quite a low speed. The speed of this shaft 66 may be, for example, three revolutions per minute. The motor is preferably of the impedance type in order to prevent damage should the motor stall.

A punch pin plate 76 is supported between its vertical ends by a suitable bracket 77 and the mounting plates 24 and 29 to hold the pin plate in parallelism with the freezer plates 31 and 32 and hence with the grids 37 and 38.

A second punch pin plate 78 is likewise fixed between the mounting plates 24 and 29 by any suitable means, herein shown as by the bracket 79. This plate 78 is parallel with the plate 76. Both plates 76 and 78 are spaced from the grids 37 and 38 respectively a distance when those grids are in contact with their freezer plates 31 and 32.

Each of these plates 76 and 78 carries a plurality of punch pins 80 aligned thereon to enter the respective cells 45 of the grids. All of the pins 80 are tapered, and all of the walls of each cell are tapered or given "draft" to be of greater cross-sectional area adjacent the freezer plates than they are at the opposite open side of the cells which are directed toward the pins 80. These pins 80 have varying lengths axially extending from the plates 76 and 78. The longest lengths are in the pins at the outer end margins of the plates. These pins 80 decrease from the longer lengths to minimum lengths centrally of the plate as indicated by the pins 80a. The lengths of the pins 80 and the positions of the plates 76 and 78 are such that when the grids are moved to their extreme right hand positions the pins will have extended through the cells 45 to have pushed out the ice blocks which have been formed therein.

In the same compartment 21 to one side of the apparatus so far described, herein shown as on the left hand side, there is mounted on the floor 26 a filter unit 82. This filter 82 is of a type commercially obtainable, and has an inner cartridge 83 which may be replaced from time to time as it may become clogged with impurities. This filter may be of a cellulose material with a suitable binder wherein the pores through the cartridge are on the order of ten to twenty microns in size. The outlet of this filter 82 is connected through the tube 57 to the water distribution pan 53.

A well or sump 84 is mounted on the floor 26 to one side of the filter 82. Trough-like extensions 85 and 86 extend from one side of the sump 84 under the grids 37 and 38 respectively throughout their entire lengths, these troughs 85 and 86 being located to be directly under the grids when those grids are pressed against the freezer plates 31 and 32. Preferably each of these troughs 85 and 86 slope downwardly from the right hand side toward the floor of the sump 84 so that water passing thereover will move with some rapidity rather than deposit impurities thereon. A water supply tube 87 enters the sump under control of a float valve 88 operated to open and closed positions by means of a float 89 dropping within the sump 84 with low or no water therein and rising with the water level particularly as that level approaches its highest desired position.

An overflow level control is had by means of a slot 90 in one side of the wall of the sump 84, FIG. 2, whereby water reaching a level above the predetermined level may flow therethrough and drain down through the floor 26 through an opening 91.

The floor 92 of the sump 84 preferably slopes from the outer water inlet end to the deepestmost part of the sump to the left hand side, FIG. 2, in which portion there is mounted a pump 93 at the bottom, driven by a motor 94. The discharge pipe 95 leads from the pump through a valve 96 to discharge into the upper part of the filter 82. It is to be noted that the filter discharge pipe 57 leads from the top of the filter.

Between the valve 96 and the pump 93 above the sump 84 is a stand pipe 97 terminating by its upper end with a capped over member constituting a pressure operated switch 98. Between the switch 98 and the pipe 95 is located in the stand pipe 97 a sight water level gauge commonly known as a manometer and designated by the numeral 99. The outlet 58 of the water distributing pan 53 is connected through a pipe or tube 100 to discharge into the sump 84.

A bracket 101, FIGS. 1 and 9, is fixed to one of the grids 37 and 38, to extend downwardly therefrom and through the rear portion of the opening 91. A switch 102 is fixed on the lower end of the bracket 101 and carries an operating flexible finger 106 whereby the switch may be closed in any direction of travel laterally of the finger 106, the switch 102 being normally closed in the absence of or under the condition of a low level of ice blocks below the switch finger.

A limit switch 107, FIG. 8, is carried by a bracket 108 to be directed toward the front face of the cam 67 which carries a button 109 to be in the path of the operating plunger 110 of the switch 107. The switch 107 is normally operated for the duration of the passage of the button 109 past the plunger 110.

Under the cabinet 21 below the floor 26 is an ice storage compartment. The opening 91 in the floor 26 opens into this storage compartment which is designated by the numeral 112. The floor 113 of this unit 112 slopes to one end thereof to a drainage zone 114 from which leads a drainage pipe 115. There is a door 116 in the front of the bin 112 to permit access for withdrawal of ice therefrom. The switch finger 106 extends into the rear upper portion of the bin 112, FIG. 1. Ice blocks 117 are indicated at the rear of the bin 112, to an elevation which is not sufficiently high to operate the finger 106. When the ice blocks pile up into the path of the finger 106, then the switch 102 is operated by the finger 106 being deformed as it passes over the ice blocks.

There is a temperature control switch 118 mounted under the floor 26 to be responsive to the temperature within the bin 112, particularly at the highest temperature zone of the bin. The bin 112 is insulated around all of its side walls and under the floor 26 and below the floor 113.

*Compressor Compartment*

There is a third compartment designated by the numeral 119 in which is carried the refrigerating machinery and an excess water eliminator. The devices in this compartment 119 are shown more or less diagrammatically. There is a refrigerant compressor 120 operating in the usual manner taking in gases through intake pipe 121 which leads from the discharging ends of the coils 35 and 36. The compressed refrigerant is discharged in a hot vaporous form through the pipe 122 to a condenser 132 where it is cooled and condensed into liquid form. A fan 133 pulls air through the condenser 132 and delivers it past the compressor 120 and over a water collecting tank 134 to discharge it through the machine louvers 135 in the front wall. Air comes into the compartment 119 through the louvers 136 in the back wall adjacent the condenser 132. The discharge from the condenser is through a pipe 136a, through an expansion valve mechanism 137 and leads to the coils 35 and 36. There is provided a solenoid controlled by-pass valve 138 in a cross-connection 139 between the pipe 122 and the pipe 140 leading from the valve 137 to the evaporating coils 35, 36. The valve 138 is normally closed.

The ice compartment discharge pipe 115 discharges into the water collector tank 134. There is a heater coil 141 adjacent the bottom of this tank 134, FIG. 1. A float ball 142 is attached to a rod 143 which is restrained to vertical travel by means of a bracket 144. The upper end of this bracket 144 carries a switch 145 to be in in the path of a head 146 fixed on the upper end of the rod 143. With a low level of water or no water at all in the tank 134, the ball 142 drops downwardly by reason of its own weight, and when the water rises in the tank 134, the ball 142 will likewise rise and cause the head 146 to push against the operating button 147 of the switch 145.

*Operation*

The mechanisms which have been described operate as follows:

The various switches and electrical devices above indicated are electrically interrelated as indicated by the wiring diagram shown in FIG. 14, which diagram will be explained along with the operation of the mechanisms.

Assuming that water has been admitted to the sump 84 and that the float 89 has risen with the rising water therein until the entering water flow has been stopped, and assuming further that there is little or no ice in the ice compartment or bin 112, and that the entire mechanism has been cut off from a source of electricity, then the line switch 150 is closed. This completes a circuit through the wires 151, 153 through the fan motor 154. The fan motor 154 operates continuously as long as the line switch 150 is closed. The heater 141 constituting a resistance coil is connected across the lines 152 and 151 by the float switch 145, this switch normally being open until the water level in the tank 134 reaches its uppermost desirable level, whereupon the switch 145 closes so that the heater 141 will then heat the water in that tank 134 even up to a boiling point. Since the fan 133 is driving a blast of air across the tank 134, vapors from the heated water as well as some vapors from the unheated water will be driven out through the louvers 135, thereby tending to lower the level of the water in the tank 134 whereupon the switch 145 will open when the water level drops to a predetermined degree carrying the head 146 away from the switch button 147. The heater 141 thus is in series between the wires 151, 152 through the wire 155 which is interrupted by the switch 145. The ice level switch 102 and the pressure operated switch 98 will both be closed under the conditions above assumed.

In this regard, the water pressure switch 98 will normally be closed, under normal operating pressure of the water delivered through the pipe 95 into the filter 82 and out the pipe 57. As the filter cartridge 83 may become filled with the impurities, resistance to water flow therethrough will build up, causing a corresponding increase in pressure in the pipe 95, whereupon the switch 98 will eventually open under the higher pressure, which would be a condition wherein there is not sufficient water being discharged from the pipe 57 into the distributing pan 53. In the beginning, the water flow is regulated by the valve 96 to be that amount going through the filter cartridge 83 and finally into the distributing pan 53 where there is an equilibrium of the water flowing out through the slots 56 and the entering water coming in through the pipe 57. The visual indication of a build up in pressure occasioned by a clogging cartridge 83 may be had by observing the level of the water in the manometer 99, the higher pressure, the higher the level of water in that gauge. However, through visual indication of the water level in the manometer 99 and manual regulation of the valve 96 a predetermined flow rate of water into the pan 53 can be maintained.

These two switches 102 and 98 are in series in the line 151.

The bin temperature switch 118 will be initially closed. Incidentally, the water pressure switch 98 requires a manual resetting after it opens. The switch 102 automatically opens upon a predetermined high level of ice in the compartment 112. Following down the wire 151, through the switches 102 and 98, there is a wire 156 leading therefrom to a relay winding 157, this winding in turn being connected through a wire 158 to the wire 152. Current energizes the winding 157 to close the relay switch 159 and establish a circuit from the wire 151 through the switch 159, wire 160, the compressor motor 161, and a wire 162 to the wire 152 thereby setting into operation the compressor 120. If either one or both of the switches 98 and 102 open, then, if the bin temperature is sufficiently high, the switch 118 will remain closed and thus operate the motor 161 until the temperature in the compartment 112 reaches the predetermined degree which will be preferably between 35 and 38 degrees F.

When the compressor motor 161 is running during ice freezing cycles, the plates 31 and 32 are brought down to below water freezing temperatures which can be set as desired, preferably ranging from slightly below zero to 10 degrees F.

The wire 152 leads to the limit switch 107 which is in the position actuated as above described in reference to the showing in FIG. 8 where the cam button 109 is pushing on the plunger 110, closing a circuit to a wire 160 which leads to the plate mounted switch 179, FIG. 4, which switch is operated in response to temperature of the refrigerating plate which controls the ice thickness on the plate. With the refrigerating plate 35 or 36 as the case may be being at a temperature above the normal initially operating temperature, this switch 179 will be in a closed position, FIG. 14, connecting with the wire 171 which leads to a second relay switch 165.

A complete ice making cycle is comprised of ice freezing and ice harvesting. The compressor motor 161 and fan 154 operate continuously during the complete cycle. During the ice freezing the pump 94 operates and the drive motor 74 and the by-pass valve 138 are inoperative. During the harvesting, the pump 94 is inoperative and the by-pass valve 138 is operated and the drive motor 74 is operated a portion of this period. Referring to FIG. 14, which discloses the electrical components employed during ice freezing, a circuit through line 151, line 169, pump motor 94, line 170, switch 165, line 171, switch 179, line 160, switch 107 to line 152 is completed to operate the pump 94. As the ice builds up in the cells 44 from the plates 31, 32 outwardly, the plate temperatures will go down to a predetermined temperature setting, such as between 0-10 degrees F. At this point, the switch 179 will be actuated through the bulb 179a. When this occurs, a circuit is completed through line 151, coil winding of a relay 163, line 178, line 173, switch 179, line 160, switch 107 to line 152 to energize the relay coil 163 which operates the switches 164, 165, 166. Actuating the switch 165 will open the circuit to the pump 94 which will cease the pump 94 operation. Actuation of switch 166 will complete a circuit from line 151, by-pass valve 138, line 176, line 175, line 174, switch 166, and line 180 to line 152 to open the by-pass valve 138 and begin discharge of hot vapors from the compressor 161 into the pipe 140 and hence to the freezer coils 35 and 36 to quickly heat those coils and also the freezer plates 31 and 32 sufficiently to melt the ice at the plates. As the plate temperatures rise, the switch 179 will return to the original position, as in FIG. 14 when the plates 31, 32 and in turn bulb 179a reach an above freezing temperature, for example 35 degrees F. The closing of switch 164 by the action of the coil winding 163 completes a circuit from line 151, coil 163, line 178, line 167, switch 164, line 168, switch 107 to line 152. This switch 164 is a holding switch for the coil winding 163 and holds the coil 163 energized after switch 179 returns to its original position. When switch 179 returns to the original position a circuit is completed from line 151, line 172, cam drive motor 74, line 177, switch 165, line 171, switch 179, line 160, switch 107 to line 152 to begin operation of the drive motor 74. As the drive motor 74 begins rotating the cams 67, 67a the button 109 is rotated from under the limit switch 107 and permits the switch 107 to open the circuit through the coil 163 which in turn permits switches 164, 165 and 166 to return to their original positions as in FIG. 14, although momentarily dropping out closed circuits are maintained for the drive motor 74 and by-pass valve 138, described as follows:

For the drive motor 74, a circuit is completed from line 151, line 172 through the motor 74, line 181, switch 166, line 174, line 175, switch 107 to line 152. For the by-pass valve 138 a circuit is completed from line 151, by-pass valve 138, line 176, line 175, switch 107 through line 152.

After the cam 167 has rotated 360 degrees, the button 109 actuates the limit switch 107 to return the switch to complete the aforesaid circuits directly connected with the ice making, to its original position as in FIG. 14.

As noted, with the above electrical circuitry and the temperature control 179a and 179, the heating of the plates 31 and 32, at the beginning of the ice harvest cycle and the movement of the grids 37, 38 from the plates 31, 32 are both initiated by the predetermined control plate temperatures.

It is to be noted that the cam track is of that configuration whereby rotation of the cam will move the grids rather rapidly towards the punch pins 80 and then causing a slower motion of the grids as the cells telescope progressively first over the longer pins and then over the shorter pins, the cams 67 and 67a then returning the grids to the positions for the next ice freezing positions.

When these grids are first brought against the freezer plates 31 and 32, there may be some water leakage between the edges of the grids in contact with the plates until the freezing operation seals over the slight gaps which might exist between those grid edges and the plates. This leaking water travels down the grids and is caught as above indicated in the sump extensions 85 and 86.

Water flows from the filter 82 into the distributing pan 53 traversing the trough 54 to flow downwardly onto each of the two grids 37 and 38, these grids having the partial cells 65 across their top edge portions, without top covers, and having back enclosing walls 185. Water flows into each and all of these cells 65 from the topside, and then flows outwardly and centrally therefrom over the noses 48 which are retracted in effect from the floor portions of the cells.

The water flowing out from the upper cells 65 flows over the nose 48 in each of the cells 44 therebelow to flow back under the undersides of the cell floors 46 and thence downwardly over the faces of the freezing plates 31 and 32 which in effect close off the back sides of the cells when the grids are against those plates. There is always an excess of water sufficient to flow from top to bottom of the grids 37 and 38 even after the ice starts to form from the freezer plates outwardly into the cells. This excess flowing water insures that the impurities and gases are washed out of the forming ice with the result that pure clear ice is formed.

The retracted noses 48 serve to prevent the water from flowing down the outer edge portions particularly of the vertical partitions 49. This is an operation insuring that each of the cells will receive sufficient and like amounts of water for the freezing step, so that some cells will not be by-passed by the water flow, and an excess of water will not be required by draining off the vertical partitions 49 as would otherwise be the case. The material of the grid partitions 49 and floors 46 is a water wettable material and is of a low degree of thermal conductivity as found in plastics. The low thermal conductivity prevents any great degree of conduction of heat between the freezer plates and grids, and likewise prevents a firm adherence of ice forming in the cells to the grid walls and floors. The vertical walls 45 maintained substantially free of the downwardly flowing water, are continually exposed to the above freezing ambient temperature of the enclosure 21 and the heat gains from this ambient temperature tend to maintain the grids 37, 38 as an ice partitioning means rather than ice forming surfaces. In this manner flat faced blocks of ice are formed rather than with a concave face as would be formed on the ice block surface over which water flowed if the walls 45, 46 were of high heat transfer material. It is necessary that the grids be substantially rigid in order to perform their functions.

It is to be noted, FIGS. 9 and 10, that the noses 48 are omitted in the bottom row of cells 65 since the water may flow over the entire surface 186 and downwardly into the respective troughs.

In the present showing, these blocks will be generally rectangular and will be relatively thin, not being formed entirely out to the edges 47.

Referring to FIG. 10 and FIG. 21, the use of a gusset 51 creates partial dams insuring that the water in the various cells 44 will be positively guided to the central noses 46 and over their rounded edges 48. Some additional rigidity is of course gained in employing these gussets 51.

The temperature of the air in the compartment 21 is maintained by the refrigerating effect of the coils 35, 36 and the plates 31 and 32 preferably within a range from 35 to 38 degrees F., in order that the compartment air will not be below freezing and cause a freeze-up of the entire mechanism therein. Therefore the grids 37, 38 being continuously within the compartment 21 approach the ambient air temperature and never have a temperature dropping down to as low as the freezer plates 31 and 32.

The filter 82 is continually refrigerated and therefore the growth of any harmful bacteria in the cartridge 83 is inhibited so that the water passing through or in the filter 82 is maintained potable. The backs of the freezer plates 31 and 32 are exposed to the ice in the storage bin 112. The ice in the bin 112 therefore is refrigerated during ice forming periods as well as necessary during non-ice forming periods.

The switch 179 actuated by change in temperature of the bulb 17a, FIG. 14, constitutes the ice block thickness control. As the ice thickness increases in each of the cells 44, the temperature of the freezer plates 31, 32 will tend to decrease.

The actuation of the switch 179 through the effect of this temperature decrease of the plates 31, 32 modifies the circuit of FIG. 14 as above described stopping the pump drive motor 94 to cut off further flow of water as the grids are moved by the cam 67 away from the plates 31, 32 following application of heat thereto by the operation of the solenoid valve 138 to send hot vapors through the coils 35 and 36, immediately preceding the institution of this movement of the grids from the plates. By warming the plates 31, 32, the bond between the ice blocks at the back of the cells 34 is melted or broken so that as the grids travel away from their respective plates 31, 32, the ice blocks are carried therewith and remain therein until the grids approach the push out pins 80 to have the cell walls telescope thereover, one cell to each pin, as above indicated, in order to conserve power and permit the use of a relatively low power motor 74. This avoidance of an excessive power input arises by reason of the fact that the ice blocks are not simultaneously pushed out of the various cells, but progressively pushed out by reason of the different lengths of pins 80 employed. It is advisable to have the pins of different lengths arranged symmetrically so that the grids will not tend to be warped during the ice ejection process. As noted in FIG. 3, the lengths of the left set of pins 80 are all equally shorter than their corresponding pins 80 in the right set. This pin length difference is sufficient so that the pins in the right set push out the ice in its mating grid before the pins in the left set do so. In this manner the ice blocks are not only progressively pushed out in an individual grid but also between grids 37, 38. The actuation of the limit switch 107 stops the flow of hot gases by restoring the solenoid valve 138 to its original closed off condition, so that the refrigerant may then be carried to the freezing coils 35, 36 when the next cycle is initiated.

In the event that there is an excess flow of water to the distributor pan 53, that excess water pouring from the trough 54 will flow down through the floor opening 26 and into the ice compartment from which, as above indicated, it will go into the evaporator pan 134. Also the water in excess flowing over the grids during the freezing operation will be collected in the sump extension troughs 85 and 86 to be collected in the sump 84. The fan 133 runs continuously, and if the evaporative effect of a blast of air across the sump 84 is not sufficient, then through the operation of the float 142, the water will be heated sufficiently to drive off vapor through the operation of the heater 141 actuated by the float operated switch 145.

Following the pushing out of the ice blocks from the grids, the cam 67 and cam 67a in unison continue to rotate and carry the grids back toward and against the freezer plates 31 and 32. This operation continues until there is sufficient ice in the bin, reflected by the bin switch 102.

The grids and freezer plates 31, 32 when in the ice freezing state of positions, have been referred to as being approximately vertically disposed. The upright angles of these grids and freezer plates may range from 90 degrees to the horizontal to 15 degrees on that side of the grids which are removed from any contact with the freezer plates and to 30 degrees from the plate contacting sides in respect to a vertical plane. However if the plates are tilted more than 15 degrees away from the plate sides, water will not flow properly back into and out of the cells. Also if the grids are inclined more than 30 degrees in the opposite direction, the water will begin to have the tendency to remain in the cells at the junction of the lower floors therein and the freezer plate. In that event, impurities carried in the water which precipitate out will cause a section of the ice forming at this juncture to be white and spongy and incorporating the deposited or precipitated impurities 190. This of course is objectionable, but if it does happen, this portion of the ice blocks may be eliminated by water flowing downwardly in the ice bin either through melting of the ice blocks themselves or from water coming as an overflow from the distributing pan 53, this spongy ice melting at a much more rapid rate than will the clear ice.

In any event, it is preferred that the freezer plates and grids be maintained in vertical planes rather than in the inclined planes in either direction.

As the ice blocks 117 drop progressively from the grids 37 and 38, they will drop downwardly and will be deflected laterally from the troughs 85 and 86 by reason of screen 200, one for each trough 85 and 86, and secured along one side thereof to extend diagonally across the troughs, FIG. 18. By use of a screen 200, the water coming down from the grids may pass through the screen into the troughs in each instance, whereas the ice blocks dropping from the grids when the grid is moved from over the troughs will be deflected to drop past the troughs and through the opening 91 into the storage bin 112.

Figure 16:
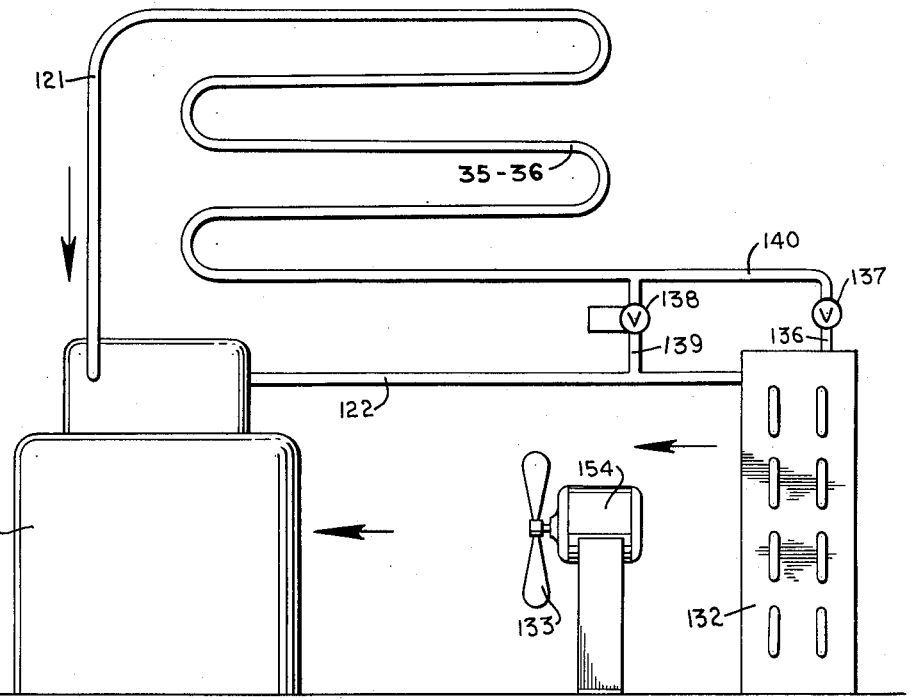
FIG. 16 is a diagram of the refrigerating system.

In the modified form of water collection along the lower edges of the grids, shown in FIGS. 16 and 17, the lower end of the grid is provided with a rounded portion 191 from which extends downwardly a generally rectangular rib 192. From one side of the rib 192, there extends spaced apart grid members 193, the spacing being such that ice blocks dropping from the grid above cannot pass therebetween. A water collecting trough 194 is fixed to the underside of the rib 192, herein shown as by a screw 195 passing through the floor of the trough, through a spacing sleeve 196 and screw-threadedly engaging in the rib 192, FIG. 17. The trough 194 is thus suspended in a fixed manner from the grids. In this form, the trough 194 swings from side to side in a manner substantially horizontal (through a shallow arc due to the swing of the arms 41 and 42). The trough slopes from one end downwardly in relation to the bottom of the grid to another end which is provided with a lip 197 which is over the top of the sump 84 whereby the water coming down the grid will drain from the trough directly into the sump 84 without the intervening sump side troughs 85 and 86. The rounded bottom of the grids aids in directing water coming down the grids into the trough 194.

The invention has been shown and described herein as employing two grids 37 and 38, as an example. The invention is not intended to be limited to that number of grids since any number of grids, one on up to multiples thereof, may be employed depending upon the capacity of ice making desired.

While I have herein shown and described my invention in the one particular form, it is obvious that structural changes may be employed without departing from the spirit of the invention, and I therefore do not desire to be limited to that precise form beyond the limitations of the following claims.

I claim:

1. An ice block forming device comprising a vertically extending freezing plate; an upright grid containing multiple cells open from opposite sides of the grid; one side of the grid having margins of the cells lying in a surface conforming to that of one side of said plate; means moving said grid to bring its said surface into contact with said plate surface; means delivering water across the upper portion of the grid to flow downwardly on the grid side removed from said plate into and out of said cells; means guiding the water flow from upper to lower cells respectively and limiting water flow from an upper cell to a central portion of its lower margin; means collecting the water at the bottom of the grid; and means recirculating the collected water over said grid.

2. An ice block forming device comprising an upstanding freezer plate; a grid formed to fit against the plate and constituting a multiplicity of cells open from opposite sides, the plate closing off one side of the cells; means moving the grid against the plate and thereaway; means pushing ice blocks from the cells when the grid is moved from the plate; refrigerating means reducing temperature of said freezer plate; means supplying water to the upper end of said grid to flow water downwardly over the grid side removed from said plate, into said cells over the exposed plate portions closing the cells and out of the cells progressively from top to bottom of the grid; water collecting means under the lower end of the grid; said supply means returning water from said collecting means to said flow; filter means in said water supplying means; and means stopping operation of said refrigerating means and said water supply means upon a predetermined water pressure build up in said supply means arising from collection of impurities from the water in the filter.

3. The structure of claim 2 in which said water collecting means comprises a sump with a partial sloping floor at least; a trough sloping from one end into the sump whereby residual precipitate from the flow of water from the grid is washed along the trough to the sump, said supplying means comprising a pump having an intake at a low end of the sump and carries the collected water through said filter means.

4. An ice making apparatus comprising a generally vertically disposed plate; means refrigerating said plate; a member having a plurality of cavities therein opening from opposite faces disposed up and down the member; means shifting the member into contact with said plate closing off openings of the cavities on the one side, and shifting the member from said contact; means maintaining an approximately constant flow of water in predetermined volume over the member into and out of said cavities on that side removed from said plate contacting face, the water flow being in excess of that required to form ice blocks in said cavities; means removing ice blocks from the cavities in the grid shifted position away from said plate; a receptacle receiving and storing said removed ice blocks; a receptacle block level sensing member actuated by movement of said cavity member in contacting ice blocks in the receptacle at a predetermined maximum level and dropping of the blocks below that level; and means controlled by said sensing member arresting and initiating respectively operation of said apparatus.

5. The combination with a plurality of ice making devices each requiring a water flow downwardly thereover, of a water distributing pan generally rectangular in shape; an outer upturned wall around the pan; an inner upturned wall around the pan spaced from the outer wall and defining a water trough therearound, the trough having water discharge holes through its bottom above said devices; said inner wall being of less height than that of the outer wall; and a floor in said pan within and coextensive with the area defined by said inner wall; said floor sloping from one end downwardly to the opposite end of the pan and having a drain outlet at the low end of the floor, whereby water in said trough exceeding the height of said inner wall overflows the inner wall and, by gravity, will drain to said drain outlet.

6. An ice block forming device comprising a generally vertical freezer plate; a grid having a multiplicity of cells open from front and back sides; the back sides of the cells being closed off by holding the grid against the plate; means holding the grid against the plate and shifting it therefrom; means maintaining a water flow downwardly over the front side of the grid while said plate is held thereagainst; means refrigerating said plate; means pushing ice blocks from the cells upon grid removal from said plate; a storage bin receiving said ice blocks; a drain from said bin; a sump receiving water from said flow upon leaving said grid and having an overflow into said bin; and a water evaporator; said drain connecting with said evaporator.

7. In an ice block making machine having a plurality of cells arranged in generally vertical alignment with approximately horizontal axes, each cell having an encircling wall open at opposite ends and of low heat conductivity; a closure on one end of said cells of high heat conductivity serving as a refrigerating member; and means flowing a film of water over said cells; said film freezing primarily from said one end.

8. An ice making device having an ice forming surface; means supplying water to said surface; refrigerating means freezing water on said surface; closed filter means in said water supplying means; and means stopping said water supply and said refrigerating means upon build up of pressure by said supplying means in the filter means due to accumulation of residue from the water supply.

9. An ice block forming device comprising a generally vertically extending freezing plate; an upright grid containing multiple cells open from opposite sides of the grid; one side of the grid having margins of the cells lying in a surface conforming to that of one side of said plate; means moving said grid to bring its said surface into contact with said plate surface; means delivering water across the upper portion of the grid to flow downwardly on the grid side removed from said plate into and out of said cells; means guiding the water flow from upper to lower cells respectively and limiting flow from an upper cell to a central portion of its lower margin; means recirculating the collected water over said grid; a floor across each of said cells; said floor having a central recess in each of said cells on said grid-removed side constituting said water flow guiding means.

10. The structure of claim 9 in which there is a member extending from said floor from each side of said recess to the sides of cells confining the water flow from the cells to that over said recess, the recess being defined by a shallow notch across which the floor terminates by a rounded edge.

References Cited in the file of this patent

UNITED STATES PATENTS

| | | |
|---|---|---|
| 577,579 | Hubbard | Feb. 23, 1897 |
| 1,373,953 | Desobry | Apr. 5, 1921 |
| 2,340,721 | Whitney | Feb. 1, 1944 |
| 2,586,588 | Weseman | Feb. 19, 1952 |
| 2,701,453 | Henderson | Feb. 8, 1955 |
| 2,746,262 | Gallo | May 22, 1956 |
| 2,775,096 | Ashley | Dec. 25, 1956 |
| 2,952,988 | MacLeod | Sept. 20, 1960 |
| 2,961,842 | Wright | Nov. 29, 1960 |
| 3,003,335 | Kattis | Oct. 10, 1961 |
| 3,010,287 | Koepoke | Nov. 28, 1961 |

FOREIGN PATENTS

| | | |
|---|---|---|
| 44,629 | Denmark | Sept. 21, 1931 |

UNITED STATES PATENT OFFICE
CERTIFICATE OF CORRECTION

Patent No. 3,144,755                          August 18, 1964

Theodore Kattis

It is hereby certified that error appears in the above numbered patent requiring correction and that the said Letters Patent should read as corrected below.

Column 1, line 24, for "protable" read -- portable --.

Signed and sealed this 4th day of May 1965.

(SEAL)
Attest:

ERNEST W. SWIDER  
Attesting Officer

EDWARD J. BRENNER  
Commissioner of Patents